United States Patent
Baba (10) Patent No.: US 7,346,223 B2
(45) Date of Patent: Mar. 18, 2008

(54) APPARATUS AND METHOD FOR FILTERING IMAGE DATA

(75) Inventor: Hiroyuki Baba, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 693 days.

(21) Appl. No.: 10/653,972

(22) Filed: Sep. 4, 2003

(65) Prior Publication Data

US 2004/0105593 A1     Jun. 3, 2004

(30) Foreign Application Priority Data

Sep. 4, 2002   (JP) .............................. 2002-258346

(51) Int. Cl.
*G06K 9/40* (2006.01)
*H04N 7/14* (2006.01)
*H04B 1/66* (2006.01)

(52) U.S. Cl. ................... 382/261; 382/233; 348/14.13; 375/240.29

(58) Field of Classification Search ................ 382/232, 382/233, 244, 261, 274, 275, 305, 312, 318; 358/1.9, 3.26, 3.27, 461–462, 474, 505, 519–521; 375/240.29; 348/14.11, 14.13; 704/200.1
See application file for complete search history.

(56) References Cited

U.S. PATENT DOCUMENTS

| | | | |
|---|---|---|---|
| 4,084,196 A | | 4/1978 | Tisue et al. |
| 5,023,919 A | | 6/1991 | Wataya |
| 5,281,981 A | * | 1/1994 | Kajita .......................... 347/116 |
| 5,715,329 A | * | 2/1998 | Murata ......................... 382/166 |
| 6,292,268 B1 | * | 9/2001 | Hirota et al. ............... 358/3.03 |
| 6,366,702 B1 | | 4/2002 | Obara et al. |
| 6,549,720 B1 | * | 4/2003 | Yamada et al. ................ 386/95 |
| 6,704,444 B2 | * | 3/2004 | Yagishita et al. ........... 382/167 |
| 6,765,695 B2 | * | 7/2004 | Chen et al. ................... 358/1.9 |
| 7,110,953 B1 | * | 9/2006 | Edler et al. .............. 704/200.1 |

FOREIGN PATENT DOCUMENTS

| | | |
|---|---|---|
| JP | 2002-190017 | 7/2002 |
| JP | 2002-209209 | 7/2002 |

* cited by examiner

*Primary Examiner*—Kanjibhai Patel
(74) *Attorney, Agent, or Firm*—Oblon, Spivak, McClelland, Maier & Neustadt, P.C.

(57) ABSTRACT

An image processing apparatus includes a filtering processor that includes a filter and switches between a pre-filtering path and a post-filtering path; a data compressor that compresses image data output from the filtering processor; an image data storage that stores the image data compressed; and a data expandor that expands the image data stored. The pre-filtering path includes a first path sending a raw image data to the data compressor via the filter and a second path passing the image data expanded. The post-filtering path includes a third path passing the raw image data to the data compressor and a fourth path sending the image data expanded to the filter.

11 Claims, 12 Drawing Sheets

CONVENTIONAL FIG. 9

CONVENTIONAL FIG. 10

FIG. 11
CONVENTIONAL

FIG. 12
CONVENTIONAL

FIG. 13
CONVENTIONAL

APPARATUS AND METHOD FOR FILTERING IMAGE DATA

BACKGROUND OF THE INVENTION

1) Field of the Invention

The present invention relates to an image processing apparatus, particularly, to a filtering processor that switches between two filtering positions, the positions being before compression and after expansion of image data.

2) Description of the Related Art

An image processing apparatus, such as a scanner and a copying machine, reads an image data, compresses the image data, stores the image data compressed in an image memory, read the image data from the image memory, and expands the image data read. The image data expanded is further recorded in a memory or sent to an external device such as a computer.

Two compressions of image data, reversible and irreversible compressions, are known. The irreversible compression differs from the reversible compression in that the image data before and after compression and expansion are not the identical.

An image processing apparatus, which processes digital data, has a filtering function (e.g., an edge highlighting) as one of important functions.

A multifunction products (hereinafter, "MFP") system, which stores multi-level images and has multiple functions such as scanning, facsimile, and printing functions, generally performs either pre-filtering or post-filtering.

Figure 9:
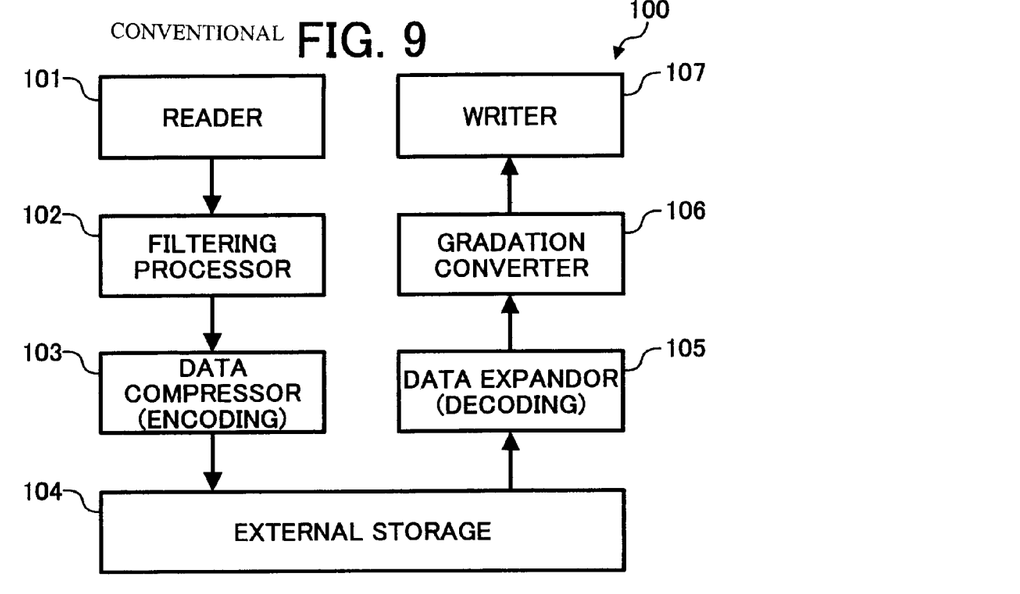
FIG. 9 is a block diagram of a conventional pre-filtering image processing apparatus.

In the pre-filtering, as is shown in FIG. 9, an MFP system 100 reads image data from a reader 101 and filters the image data by passing through a filtering processor 102. The image data filtered is encoded by a data compressor (encoder) 103 in each 8 bit and is then stored in an external storage 104. The MFP system 100 then reads the 8 bit data from the external storage 104 and expands the 8 bit data by a data expandor (decoder) 105. The 8 bit data expanded is subjected to gradation conversion (dithered) by a gradation converter 106 and then printed out by a writer 107.

Figure 10:
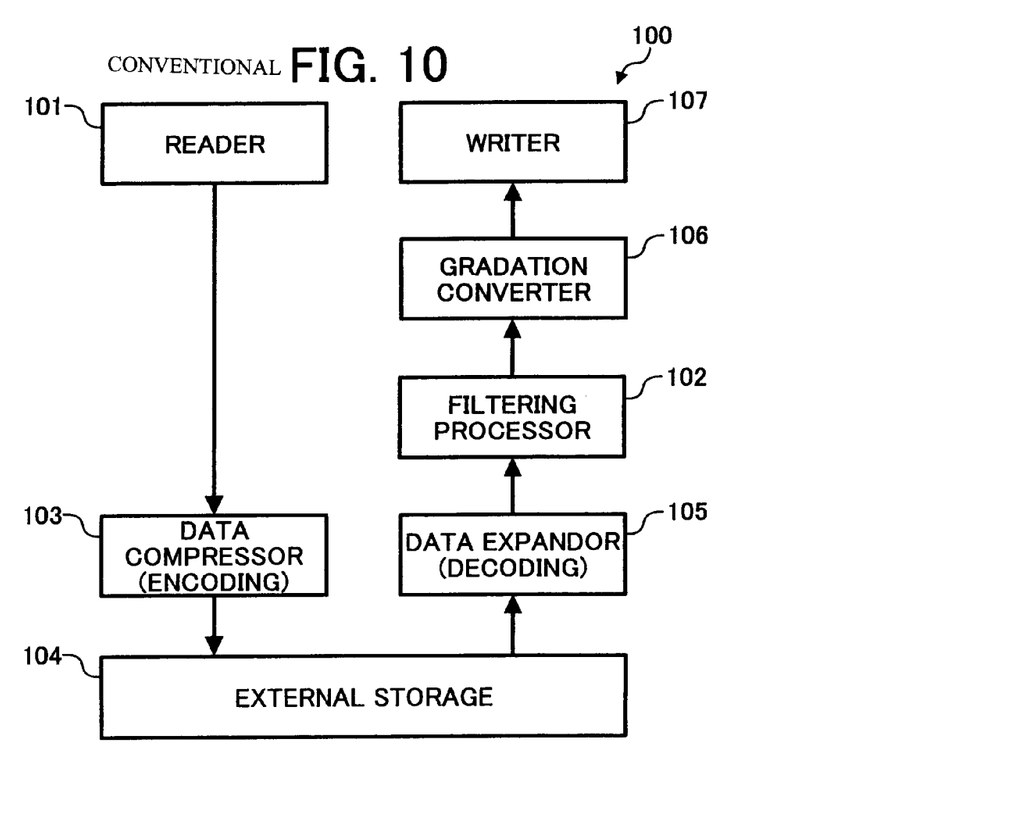
FIG. 10 is a block diagram of a conventional post-filtering image processing apparatus.

On the other hand, the post-filtering is shown in FIG. 10. Same reference numerals are used for same components in FIG. 9. In the post-filtering, the image data read from the reader 101 and the 8 bit data compressed by the data compressor 103 are stored in the external storage 104. The MFP system 100 then reads the 8 bit data from the external storage 104 and expands the 8 bit data by the expandor 105. The 8 bit data expanded is filtered by the filtering processor 102. The 8 bit data filtered is subjected to gradation conversion (dithered) by the gradation converter 106 and then printed out by the writer 107. 10.

Further, when the compression and expansion by the data compressor 103 and the data expandor 105 conform to the reversible compression, the same print output is obtained in both the pre-filtering and the post filtering. However, when the compression and expansion conforms to the irreversible compression, the print output is different in the pre-filtering and the post filtering, resulting in different image quality. This is because the frequency component of the image data is partially lost so as to reduce the size of the image data.

Thus, in a MFP system that employs the irreversible compression, the characteristics of output data are affected considerably depending on whether the filtering of the image data is the pre-filtering or the post-filtering. In other words, the filtering position is an important factor.

The irreversible compression, in many cases, makes a loss of the frequency component to the image data, thereby resulting in a phenomenon like a tendency to decrease in the edge sharpness of a character.

Figure 11:
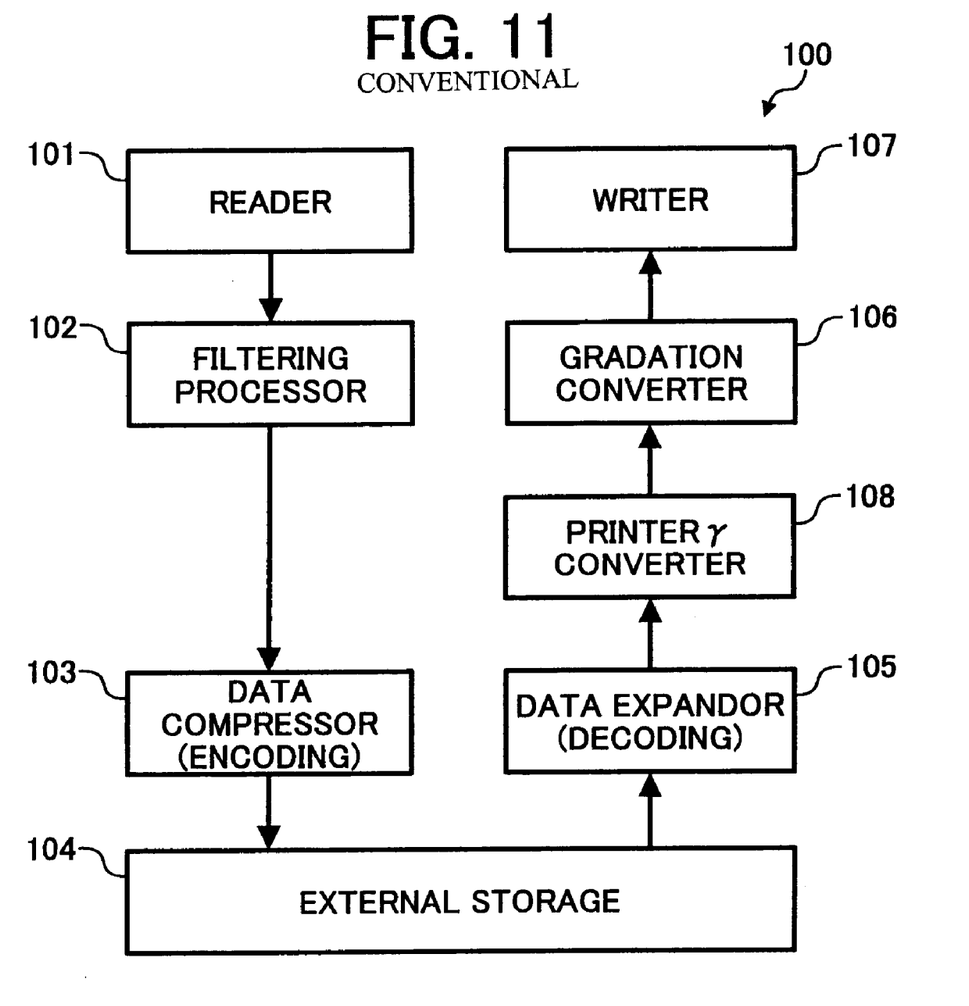
FIG. 11 is a block diagram of another conventional pre-filtering image processing apparatus.

To correct the decrease in the edge sharpness, the filtering processor 102 as shown in FIG. 11 performs the strong edge highlighting on image data read from the reader 101, in case of the loss of the frequency component due to the irreversible compression. The image data filtered is compressed by the data compressor 103 and stored in the external storage 104. The image data stored in the external storage 104 is expanded by the data expandor 105 and then is processed in a printer γ converter 108. After that, the image data is processed in the gradation converter 106 and then printed out by the writer 107. As a result, sharpness of characters is compensated. In the other words, even if edge data of a character is partially lost due to the irreversible compression, the improvement in sharpness of a character is not restricted and the image quality can be improved.

Moreover, when the image process is switched (hereinafter "adaptive γ conversion") according to judgment whether on edge area or on no edge area (inside) of a character (e.g., a printer γ conversion table for adjusting the output density), to cut the cost down, the judgment is performed by using a first in first out (hereinafter, "FIFO") buffer for the filtering.

Figure 12:
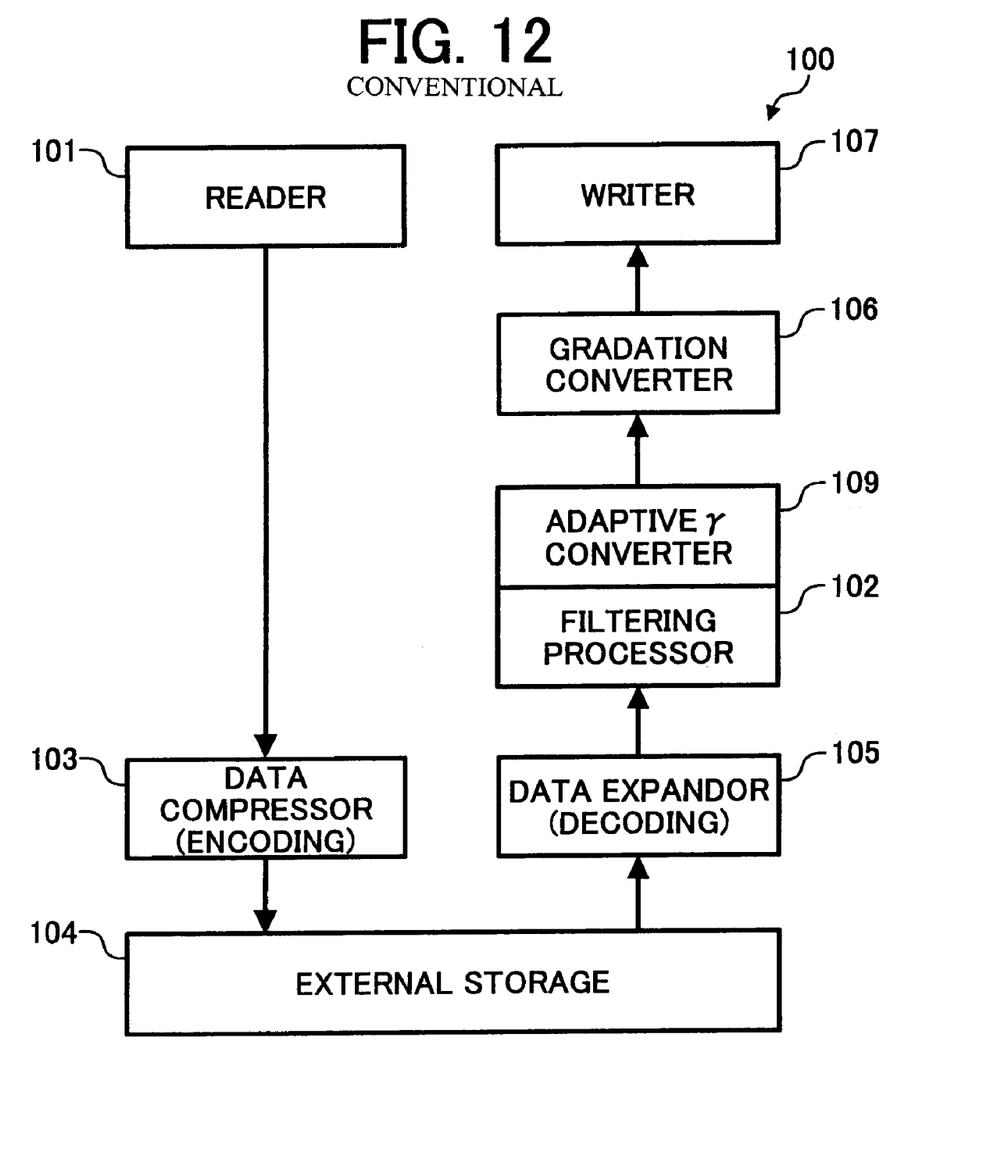
FIG. 12 is a block diagram of another conventional post-filtering image processing apparatus.

For example, as shown in FIG. 12, the image data read from the reader 101 is compressed by the data compressor 103 and then stored in the external storage 104. The image data stored in the external storage 104 is expanded by the data expandor 105 and filtered by the filtering processor 102. For the image data filtered, the judgment of whether on edge area or on no edge area (inside) is performed by using a FIFO buffer of the filtering processor 102. According to the judgment, the image data is subjected to adaptive γ conversion by the adaptive γ converter 109. Then, the image data is subjected to gradation conversion by the gradation converter 106 and print output is obtained in the writer 107. The γ conversion table depends on whether the image data is in the character area or in the picture area. Therefore, it is possible to obtain image density that is suitable to the corresponding area, so that the quality of mixture images of characters and pictures are improved.

However, since the printer γ conversion is a function to adjust the density of printing, in an image processing apparatus that stores 8 bit data like the MFP system 100, the printer γ conversion must be performed in the subsequent stage.

Moreover, the post-filtering requires that both the filtering and the adaptive γ conversion are performed in the subsequent stage of the compression and expansion.

Figure 13:
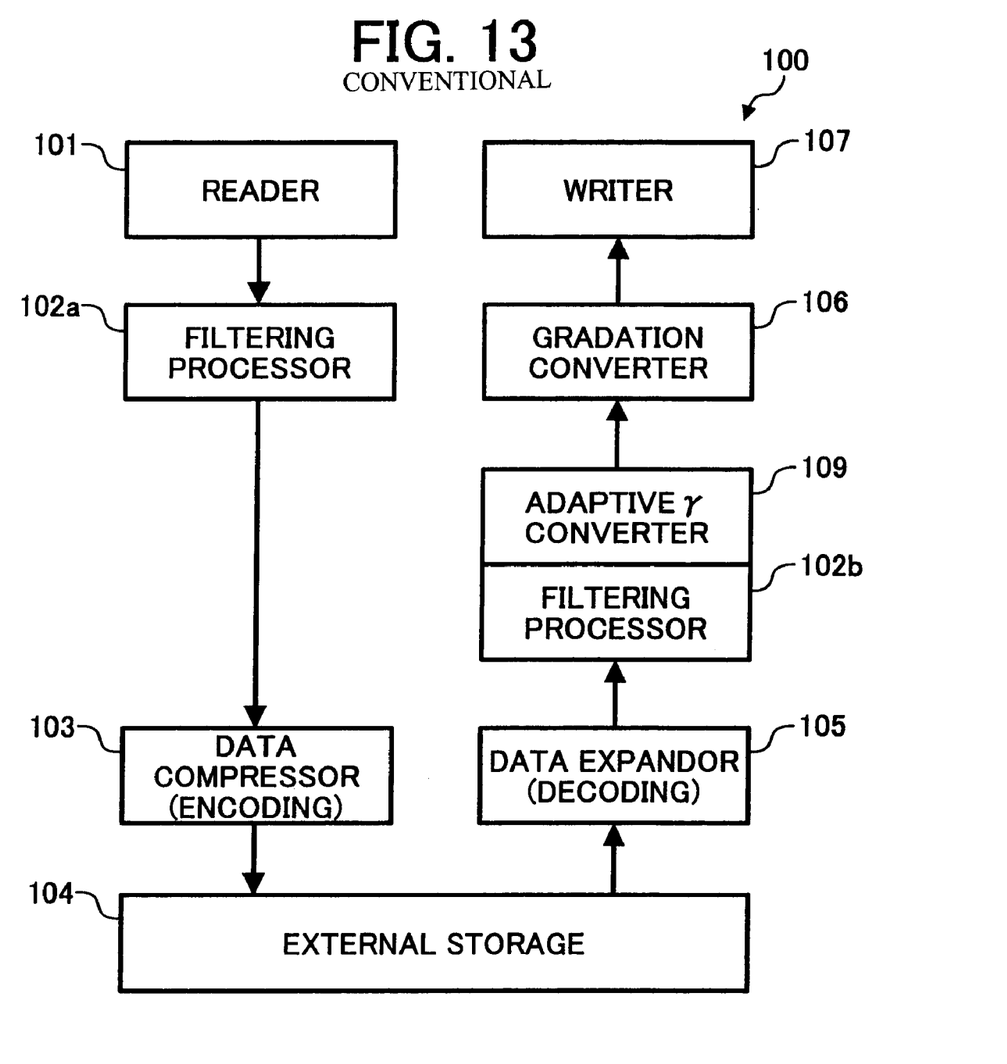
FIG. 13 is a block diagram of a double filtering conventional image processing apparatus.

Therefore, the conventional image processing apparatuses as described above, to improve the image quality, require switching between the pre-filtering and the post-filtering according to the image data. However, to switch between the pre-filtering and the post filtering, there is a need to provide two filtering processors 102a and 102b respectively at the previous and subsequent stages of compression and expansion, as shown in FIG. 13. Moreover, each of the processors 102a and 102b must include the FIFO buffer. Such an image processing apparatus is high cost.

SUMMARY OF THE INVENTION

It is an object of the present invention to at least solve the problems in the conventional technology.

The image processing apparatus according to one aspect of the present invention includes a filtering processor that includes a filter and switches between a pre-filtering path and a post-filtering path; a data compressor that compresses image data output from the filtering processor; an image data storage that stores the image data compressed; and a data expandor that expands the image data stored, wherein the pre-filtering path includes a first path sending a raw image data to the data compressor via the filter and a second path passing the image data expanded, and the post-filtering path includes a third path passing the raw image data to the data compressor and a fourth path sending the image data expanded to the filter.

The method for filtering image data according to another aspect of the present invention includes choosing between a pre-filtering path and a post-filtering path; filtering raw image data when the pre-filtering path is chose; compressing the image data filtered when the pre-filtering path is chose, and compressing the raw image data when the post-filtering path is chose; storing the image data compressed; expanding the image data stored; and filtering the image data expanded when the post-filtering path is chose.

The other objects, features and advantages of the present invention are specifically set forth in or will become apparent from the following detailed descriptions of the invention when read in conjunction with the accompanying drawings.

DETAILED DESCRIPTION

Exemplary embodiments according to the present invention will be explained in detail below with reference to the accompanying drawings. However, the scope of the present invention is not restricted only to the aspects in the embodiments.

Figure 1:
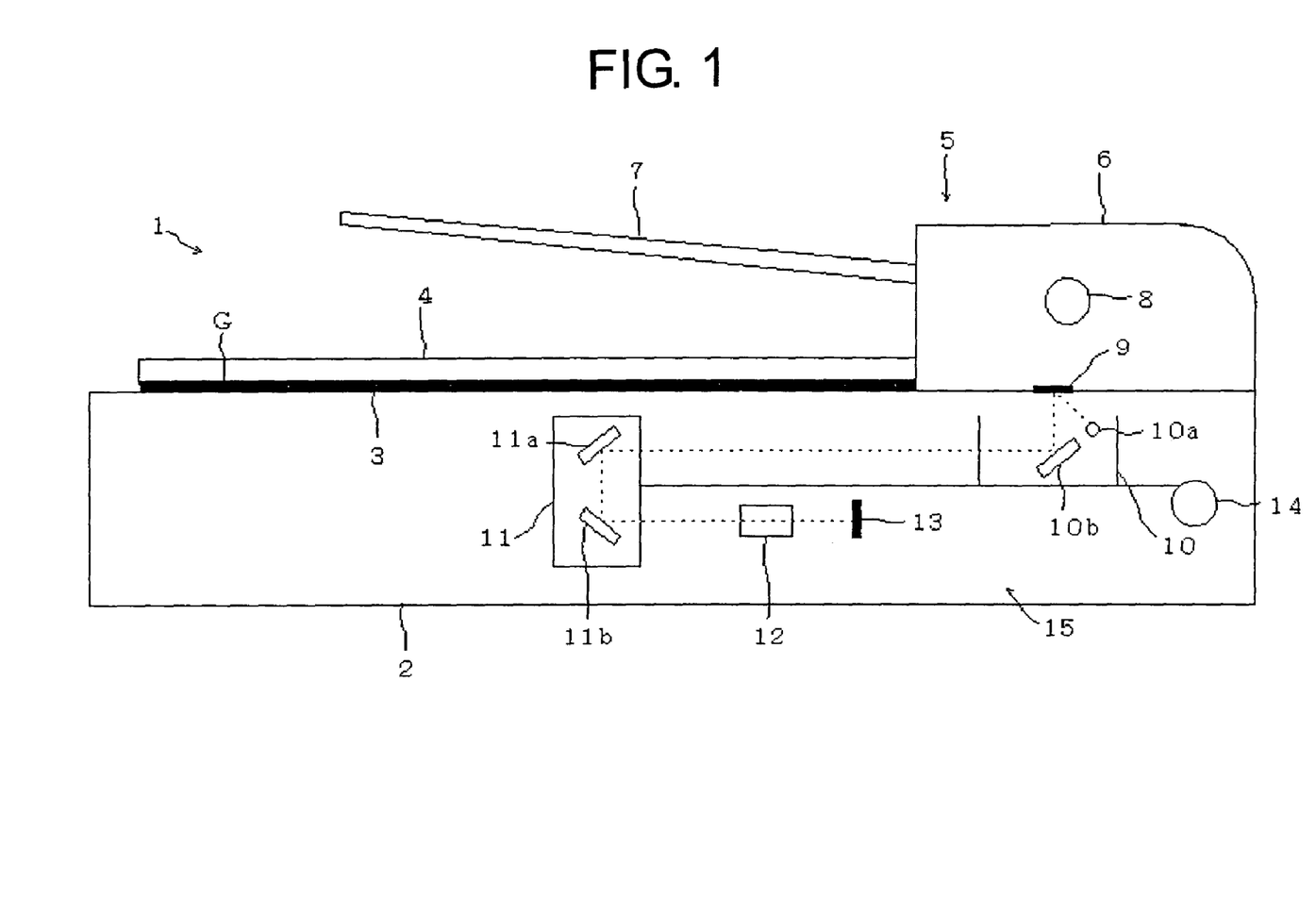
FIG. 1 is a schematic front view of an image processing apparatus according to an embodiment of the present invention.

FIG. 1 is a schematic front view of an image processing apparatus according to the present invention. The image processing apparatus 1 includes a contact glass 3, on which a document to be read is set, on a topside of a main body 2 of an apparatus. A platen 4 is provided on a topside of the contact glass 3. A user lifts the platen 4, sets a document G on the contact glass 3, and then lower the platen 4. As a result, the document G is close to the contact glass 3.

An automatic document feeder 5 is disposed on right topside of the main body 2 in FIG. 1. The automatic document feeder 5 includes an automatic document feeding (hereinafter "ADF") unit 6 and a feeding tray 7. The ADF unit 6 includes a stepping motor 8. A plurality of documents G can be piled up on the feeding tray 7. The ADF unit 6 in the automatic document feeder 5 separates the plurality of documents G one by one that are piled up on the feeding tray 7. A separated document G is passed over the contact glass 3 by a separating roller 17 that is driven by the stepping motor 8 and pairs of transporting roller 18 and 19 (see FIG. 3), and carried to the document discharging tray (not shown in the figure).

A white reference plate 9 for shading correction is disposed at a side of the contact glass 3 towards the ADF unit 6. The automatic document feeder 5 is structured integrally with the platen 4 and when the platen 4 is lifted, the automatic paper feed 5 is lifted as well.

A first scanning component 10, a second scanning component 11, a lens 12, a charge coupled device (hereinafter, "CCD") 13, and a scanning optical system 15 that includes a stepping motor 14, are disposed inside the main body 2. The first scanning component 10 includes a light source 10a and a mirror 10b, and the second scanning component 11 includes mirrors 11a and 11b.

In the scanning optical system 15, the first scanning component 10 and the second scanning component 11 are moved horizontally (in a direction of secondary scanning). The light source 10a like a fluorescent lamp, irradiates light on a document G on the contact glass 3. The light reflected from the document G is reflected by the mirror 10b in the first scanning component 10 in the direction of the scanning component 11. The light from the first scanning component 10 is reflected from the mirrors 11a and 11b in the second scanning component 11 one after another and is outgoing to the lens 12. The lens 12 gathers the light from the second scanning component 11 to the CCD 13 and allows it to irradiate. The CCD (line sensor) 13 includes a plurality of CCD elements as photoelectric sensing elements in one-dimensional lined up. The CCD elements transfer (sense) the light incoming from the lens 12 and outputs analog image data (image signal). Moreover, the scanning optical system 15 irradiates light on the white reference plate 9 and the light reflected from the white reference plate 9 is allowed to fall on the CCD 13 similarly as mentioned above and is output from the CCD 13 as white reference plate data.

Figure 2:
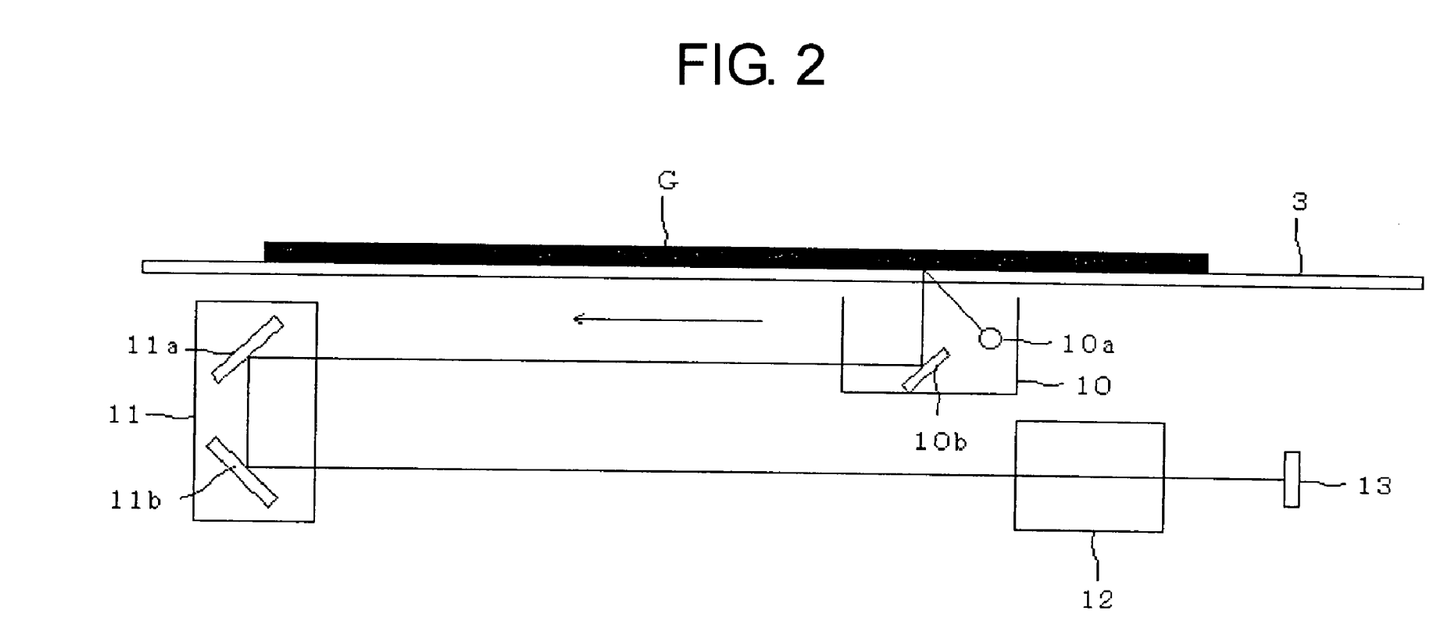
FIG. 2 is a schematic front view of scanning parts of the image processing apparatus in a book mode.

The image processing apparatus 1 has two modes, a book mode and an ADF mode, for reading of a document. In the book mode, an image on a document G that is kept on the contact glass 3 by lifting the platen 4, is read as shown in FIG. 2. In the ADF mode, by using the automatic document feeder 5, the plurality of pairs of rollers 17 to 19 are driven by the stepping motor 8 to carry a plurality of documents G one after another from the feeding tray 7 to a predetermined reading position. An image on the document G is read by irradiating light from the light source 10a of the stationary first scanning component 10 on the document G.

In the book mode of the image processing apparatus 1, when the platen 4 is lifted and a document G is set on the contact glass 3, the light source 10a is turned on and the white reference plate 9 is read first as shown in FIG. 2. Then, reference data for the shading correction is acquired. Further, the stepping motor 14 is driven and the first scanning component 10 and the second scanning component 11 move in the direction of second scanning where the optical path length between the document G and the CCD 13 becomes uniform and an image on the document G on the contact glass 3 is read.

Figure 3:
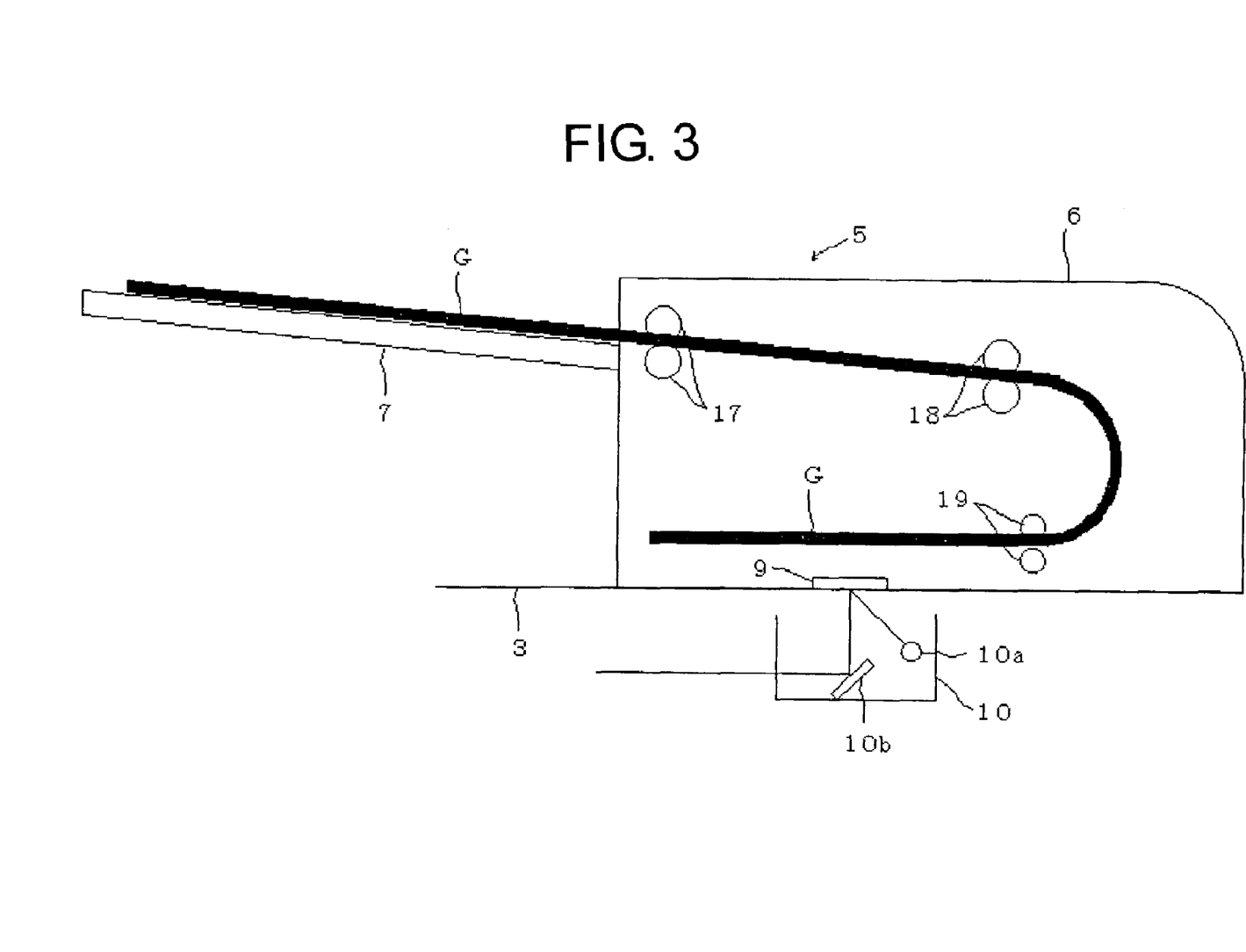
FIG. 3 is a schematic front view of scanning parts of the image processing apparatus in an automatic document feeder mode.

On the other hand, in the ADF mode of the image processing apparatus 1, when a plurality of documents G is set in the feeding tray 7, to start with, the light source 10a is turned on and the white reference plate 9 is read as shown in FIG. 3. Then, the stepping motor 8 is driven to separate documents G one after another set in the feeding tray by the separating roller 17. The separated documents are carried by the pairs of transporting rollers 18 and 19 to the predetermined reading position of the first scanning component 10. Here, the documents G are carried at a uniform speed. With the first scanning component 10 and the second scanning component 11 in a halting position, the light is irradiated from the light source 10a of the first scanning component 10 to the document G. The light reflected from the document G is reflected by the mirror 10b and the mirrors 11a and 11b in the second scanning component 11. The reflected light is allowed to fall on the CCD 13 through the lens 12. The light is subjected to photoelectric transfer (sensing) at CCD 13 and the image on the document G is read.

Figure 4:
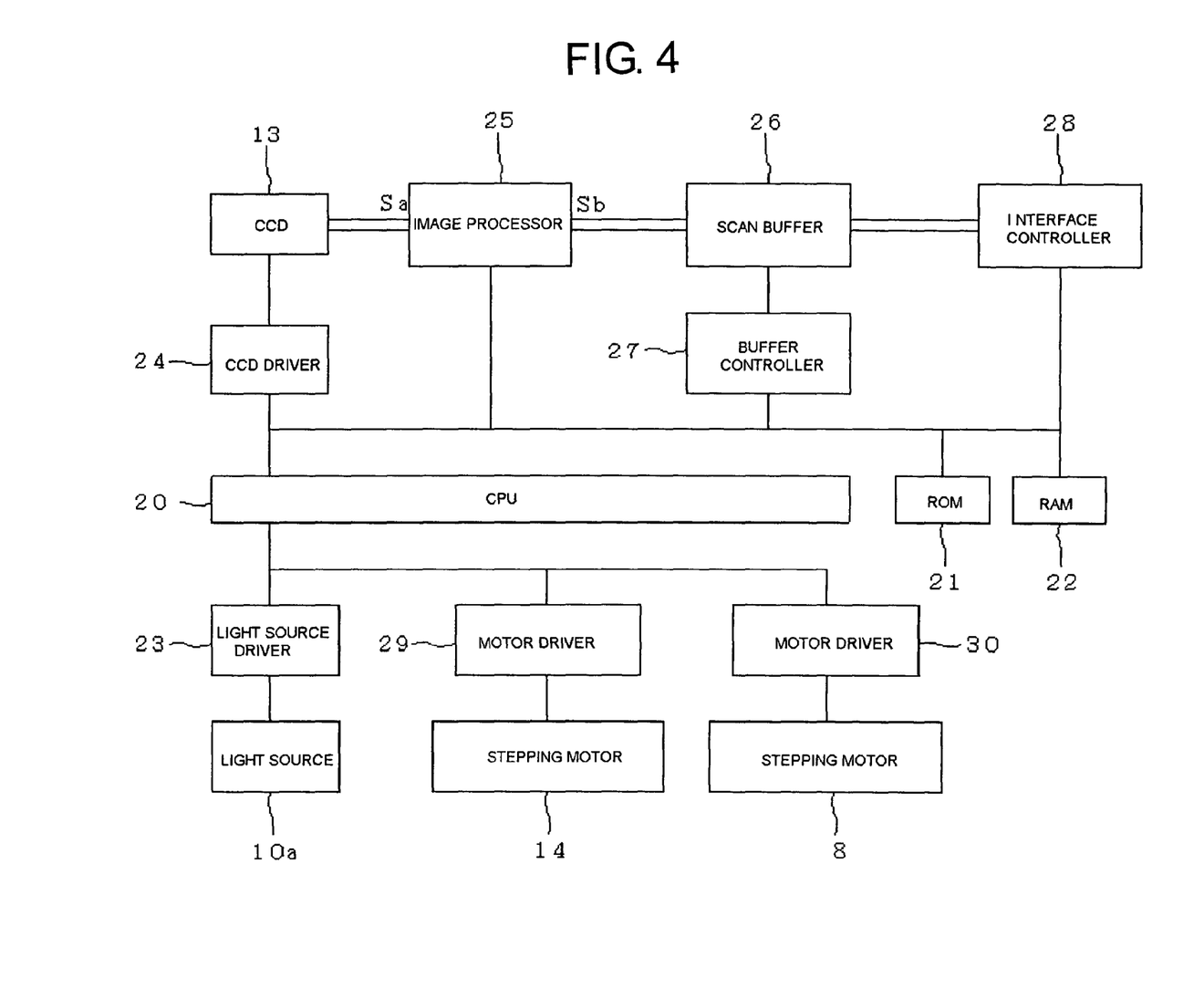
FIG. 4 is a circuit block diagram of the image processing apparatus.

The image processing apparatus 1 includes circuit blocks of a central processing unit (hereinafter, "CPU") 20, a read only memory (hereinafter, "ROM") 21, a random access memory (hereinafter, "RAM") 22, a light source driver 23, a light source 10a, a CCD driver 24, a CCD 13, an image processor 25, a scan buffer 26, a buffer controller 27, an interface controller 28, a motor driver 29, a stepping motor 14, a motor driver 30, and a stepping motor 8.

The ROM 21 stores programs like a basic process program of the image processing apparatus 1, a filtering switching program that is mentioned later etc., and data required to execute these programs. RAM 22 stores data required for operation of the image processing apparatus 1. The CPU 20 executes the program in ROM 21 by using RAM 22 as a work memory. The program controls the components of the image processing apparatus 1 thereby executing the sequence as the image processing apparatus and switches filtering that is mentioned later.

The light source 10a is turned on and off by the light source driver 23 controlled by the CPU 20. The CCD 13 is driven by the CCD driver 24 and outputs image data that is subjected to photoelectric transfer (sensing) to the image processor 25.

The stepping motor 8 is driven by the motor driver 30 and the stepping motor 14 is driven by the motor driver 29.

Figure 5:
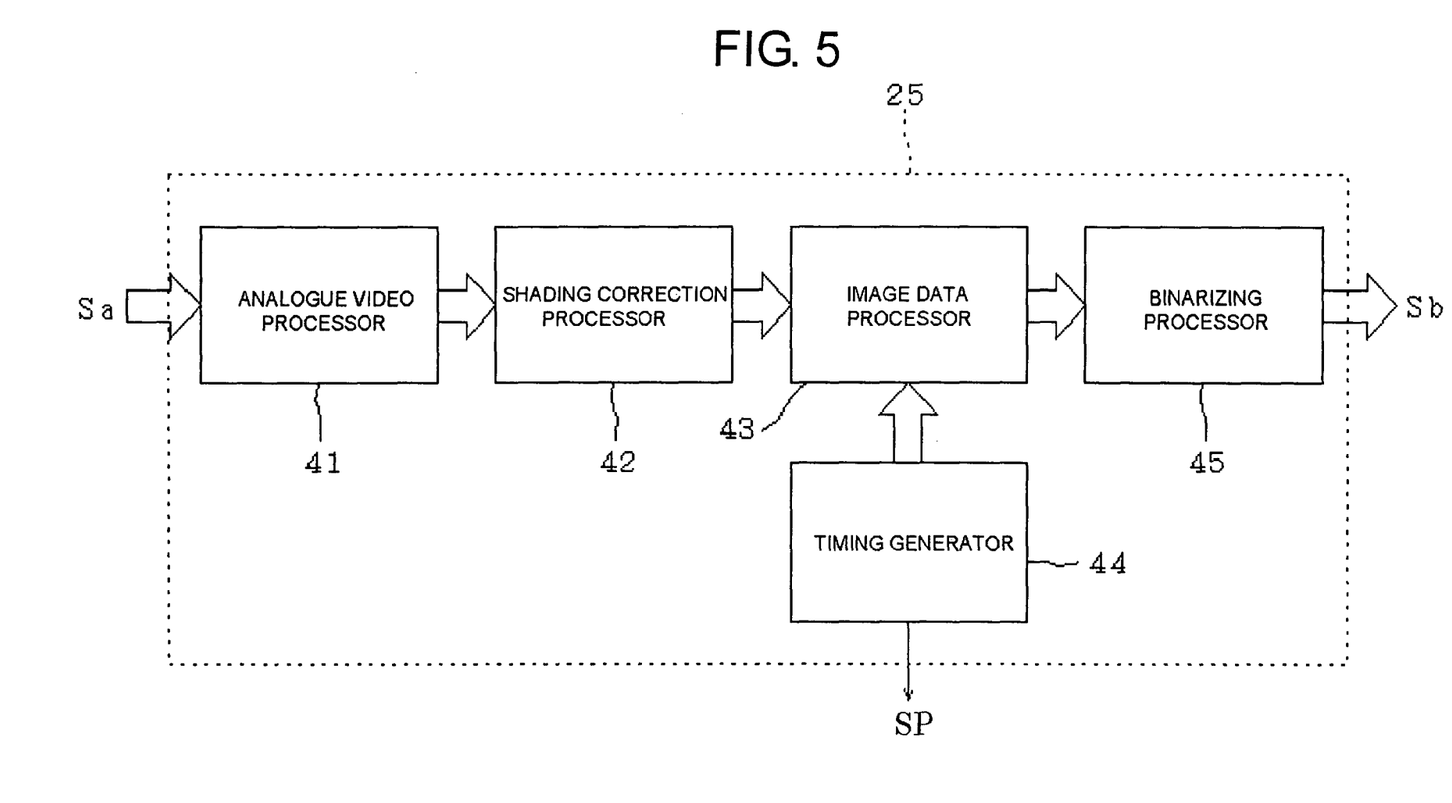
FIG. 5 is a circuit block diagram of an image processing section in FIG. 4.

The scan buffer (image data storing unit) 26 is connected to the image processor 25. The image processor 25 includes an analog video process 41, a shading correction processor 42, an image data processor 43, a timing generator 44, and a binarizing processor 45.

An analog image signal Sa that is output from the CCD 13 is input to the analog video processor 41. The analog video processor 41 converts the analog image signal Sa to digital image data and outputs it to the shading correction processor 42.

The shading correction processor 42 stores the image data when white reference plate 9 is read, in the RAM as reference data and carries out shading correction based on reference data corresponding to image data when the document G is read. The shading correction processor 42, then outputs image data after the shading correction, to the image data processor 43.

The image data processor 43 processes the image data that is processed in the shading correction processor 42, according to an enable signal EN that is input from the timing generator 44. The processed data is then output to the binarizing processor 45. The binarizing processor (compressor, expandor) 45 converts the processed image data to either binary data or multi-value data by irreversible compression and outputs it to the scan buffer 26 and expands the compressed image data that is in the scan buffer 26. The image data processor 43 stores data of few lines in a line buffer, forms matrix, and carries out space filtering of the image data. Moreover, the timing generator 44 outputs stepping pulse SP to the motor driver 29 and the motor driver 30, and controls the drive timing of the stepping motor 14 and the stepping motor 8 through the motor driver 29 and the motor driver 30.

In the image processor 25, the processed image data Sb is stored in the scan buffer 26 under the control of the buffer controller 27. This stored data is output to another information processing unit (not shown in the figure) like a personal computer through the interface controller 28.

Figure 6:
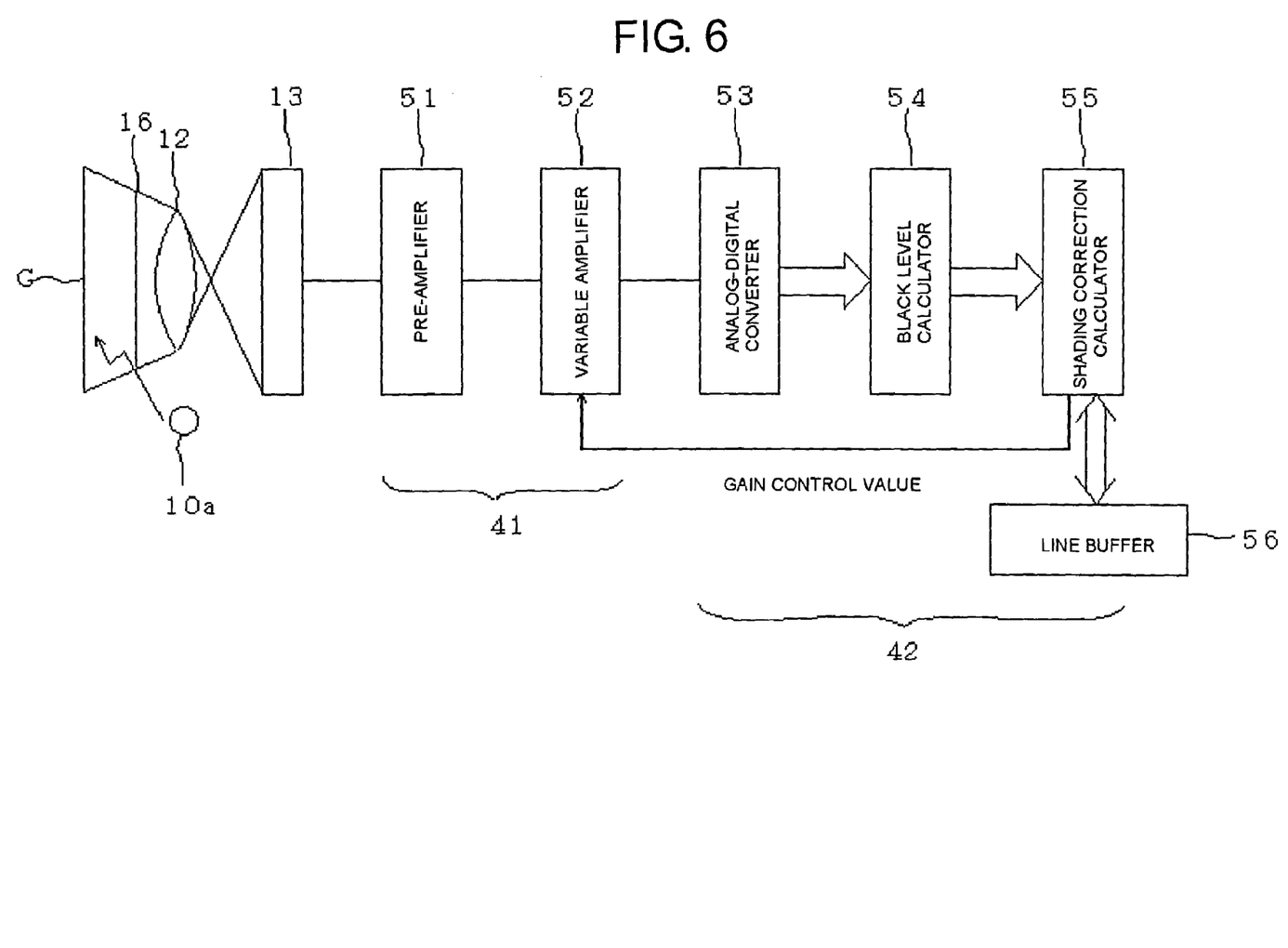
FIG. 6 is circuit block diagram of the image processing section in FIG. 5 in further details.

The image processor 25 includes a pre-amplifier 51, a variable amplifier 52, an analog-digital converter 53, a black level calculator 54, a shading correction calculator 55, and a line buffer 56 as shown in FIG. 6.

In the image processing apparatus 1, the light source 10a irradiates light on a document G on the contact glass 3. The light reflected from the document G passes through a shading adjustment plate 16, then gathered by the lens 12, and an image is formed in the CCD 13. In FIG. 6, a mirror that returns the reflected light is omitted for simplification. The shading adjustment plate 16 adjusts the light to eliminate the difference between the reflected light at the center and at the end of the CCD 13. In other words, if there is a great difference between the reflected light at the center and at the end of the CCD, only the result of shading calculation including lot of distortion is obtained. Therefore, the shading calculation is carried out after eliminating the difference between the reflected lights in advance, by the shading adjustment plate 16.

The analogue video processor 41 includes the pre-amplifier 51 and the variable amplifier 52. The shading correction processor 42 includes the analog-digital converter 53, the black level calculator 54, the shading correction calculator 55, and the line buffer 56.

The image data processor 43 processes the image data input from the shading correction processor 42 that is subjected to shading correction by carrying out adaptive γ conversion of switching the image processing according to whether on edge area or no edge area (inside). This includes, particularly, filtering like an edge highlighting filtering etc.

The CPU 20 determines whether the image data processor 43 carries out this filtering and which filtering is to be carried out.

Figure 7:
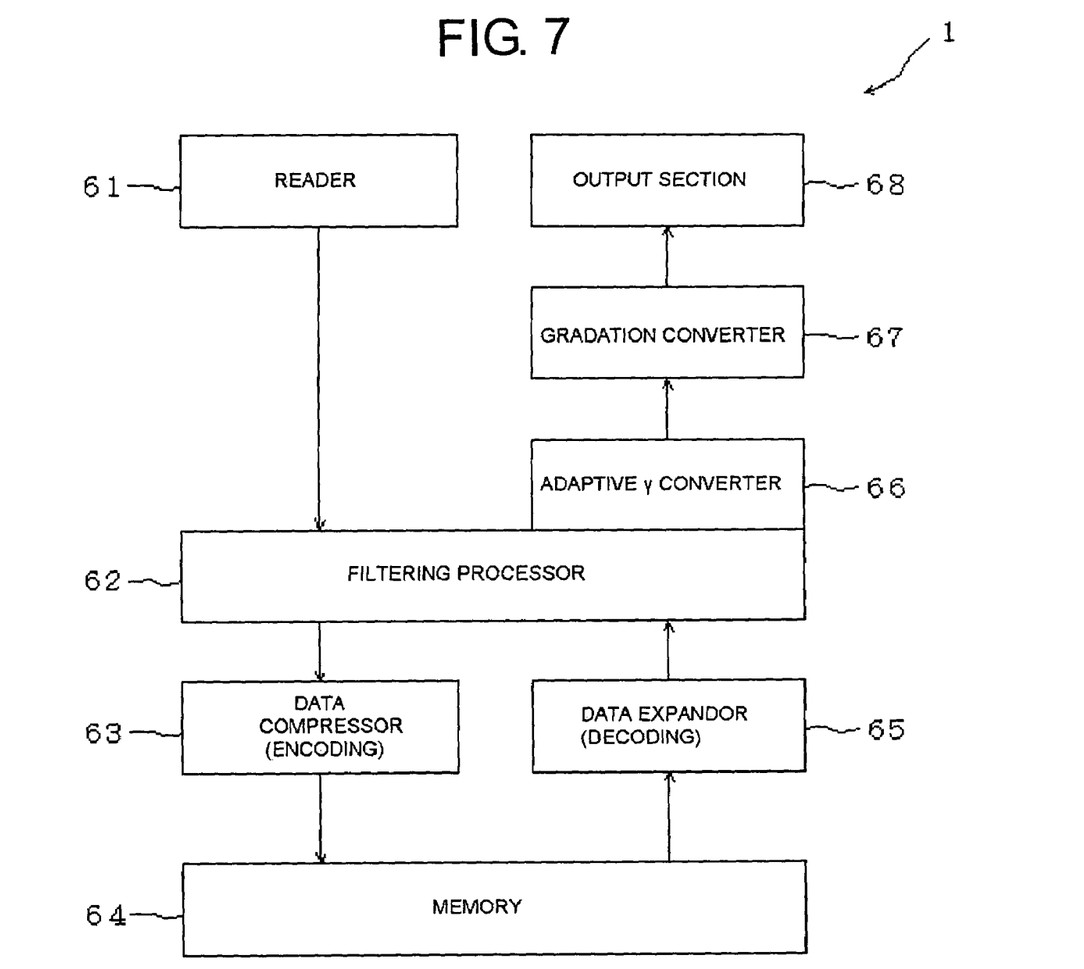
FIG. 7 is a function block diagram of the image processing apparatus.

Thus, the image processing apparatus 1 can be represented functionally as in FIG. 7 including a reader 61, a filtering processor 62, a data compressor 63, a memory 64, a data expandor 65, an adaptive γ converter 66, a gradation converter 67, and an output section 68.

The filtering processor carries out pre-filtering and post-filtering. In pre-filtering, image data is read in the reader 61, and compressed in the data compressor 63. The compressed data is filtered before storing image data in the memory 64. In post filtering, image data stored in the memory 64 is expanded in the data expandor and then filtered. The CPU 20 determines which filtering is to be carried out and switches accordingly. In a case of pre-filtering, the image data output from the expandor 65 and in a case of post-filtering, the image data output from the filtering processor 62, are input respectively to the adaptive γ converter 66. The image data output from the adaptive γ converter 66 is converted in the gradation converter 67 and then output from the output section 68.

Figure 8:
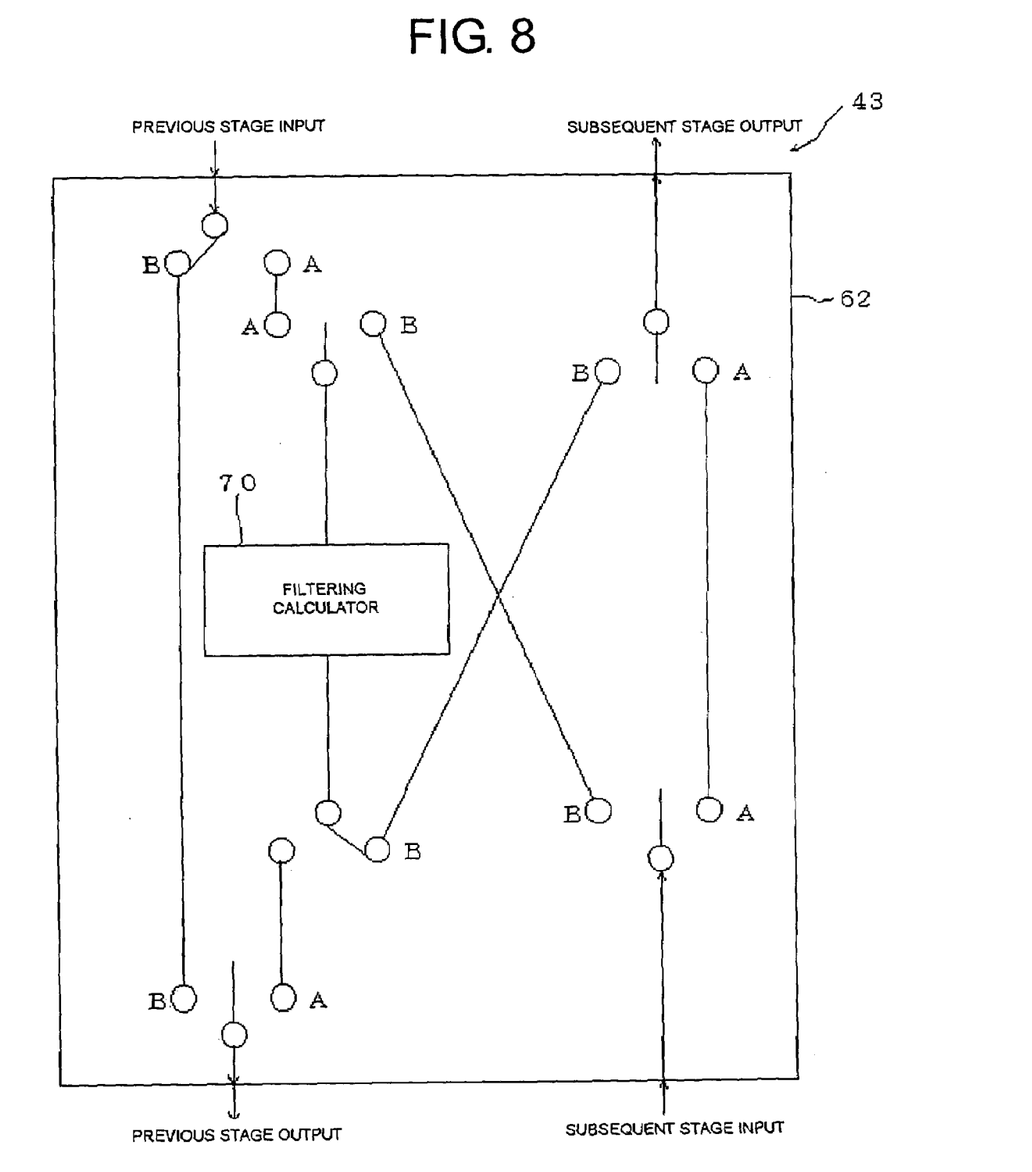
FIG. 8 is a schematic diagram of the filtering processor in FIG. 7.

In other words, the filtering processor 62, switches the flow of the image data to a filtering calculator 70 by switching between a register A and a register B as shown in FIG. 8, thereby switching between the pre-filtering and the post filtering. If the filtering processor 62 is connected to the register B, in a previous stage, instead of the image data entering into the filtering calculator 70 from the previous stage input, it enters into the memory 64 from the previous stage output. The image data from the subsequent stage input from the memory 64 go into the filtering calculator 70 through the register B, output from the subsequent stage output and then subjected to post-filtering. Moreover, the filtering processor, while pre-filtering connects to register A and first of all, image data from previous stage output enters into the filtering calculator 70. The image data is filtered in the filtering calculator, enters into the memory 64 from a previous stage output, and is subjected to pre-filtering. Further, when the image data from the memory 64 is input from the subsequent stage input if the connection is still with the register A, image data from the subsequent stage input from the memory 64 is output as it is from the subsequent stage output through the register A. When the pre-filtered image data is input from the subsequent stage input of the memory 64, if a switching to register B takes place, the data is subjected to post-filtering, thus both of the pre-filtering and the post-filtering are carried out.

As a result, the image data processor 43 filters data by switching between the pre-filtering and the post-filtering. Switching between the register A and register B under the control of CPU 20 as shown in FIG. 8 carry out the switching between the pre-filtering and the post-filtering. In pre-filtering, the compressed image data is filtered before storing in the scan buffer 26, which is the memory 64 as shown in FIG. 7 and in the post-filtering the image data that is compressed and stored in the scan buffer 26 is filtered after expansion.

For example, the image data processor 43 carries out pre-filtering if a large part of the information on document G is characters and the image data processor 43 carries out post-filtering if a large part of the information on document G is characters and pictures. Any one or either of the pre-filtering and the post-filtering may be carried out. Moreover, the pre-filtering and the post-filtering may be carried out in two ways. In the first way, the user of the image processing apparatus 1, judges from the information on a document that is read by the image processing apparatus 1 and the operation is carried out based on instructions from the operating section of the image processing apparatus 1. The CPU 20 controls the switching between the pre-filtering and the post-filtering in accordance with the operation. In the second way, the image processing apparatus 1, for example the image data processor 43, judges from an image on the document G and the CPU 20 controls the switching between the pre-filtering and the post-filtering. In this case, the CPU 20 is a control unit of the present invention.

Thus, in the image processing apparatus 1 in the present embodiment, digital image data that is subjected to irreversible compression is stored in the scan buffer 26. The compressed image data in the scan buffer 26 is expanded and the digital image data is subjected to predetermined filtering in the image data processor 43 that is a filtering unit. The filtering is carried out by switching between the pre-filtering i.e. the filtering before the compression of the image data and the post-filtering i.e. the filtering after the expansion of the image data.

In this way, it is possible to carry out filtering in the image data processor 43 that is a filtering unit, by switching between the pre-filtering and the post filtering according to the characteristics of the image data that is subjected to processing. This enables to improve the image quality at a low cost and to have an output with characteristics to meet the expectations of a user.

In the image processing apparatus 1 in the present embodiment, when information of the image data is mainly character information, the image data is subjected to the pre-filtering. The image data is mainly character information, here means that 80 percent or more of the image data is character information. However, it is not restricted to this figure of 80 percent.

Thus, it is possible to improve the sharpness of characters of the image data, which is main information, thereby improving the image quality remarkably, at a low cost.

Moreover, in the image processing apparatus 1 in the present embodiment, when information of the image data is mainly character information and picture information, the image data is subjected to post-filtering. The image data is mainly character information and picture information, here means that 80 percent or more of the image data is character information and picture information. However, it is not restricted to this figure of 80 percent.

Thus, it is possible to improve the sharpness of characters and reduce moiré of a screening picture, thereby improving the image quality of both characters and pictures remarkably, at a low cost.

The present document incorporates by reference the entire contents of Japanese priority documents, 2002-258346 filed in Japan on Sep. 4, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
    a filtering processor that includes a filter and is configured to switch between a pre-filtering path and a post-filtering path;
    a data compressor configured to compress image data output from the filtering processor;
    an image data storage unit configured to store the image data compressed by the data compressor; and
    a data expander configured to expand the image data stored in the image data storage unit, wherein
    the pre-filtering path includes a first path configured to send a raw image data to the data compressor via the filter and a second path configured to pass the image data expanded, and
    the post-filtering path includes a third path configured to pass the raw image data to the data compressor and a fourth path configured to send the image data expanded to the filter.

2. The image processing apparatus according to claim 1, wherein the data compressor is configured to irreversibly compress the image data output from the filtering processor.

3. The image processing apparatus according to claim 1, wherein the filtering processor is configured to switch between the pre-filtering path and the post-filtering path based on information of the image data.

4. The image processing apparatus according to claim 3, wherein the filtering processor is configured to switch to the pre-filtering path when a ratio of character information to the information of the image data is larger than a predetermined value.

5. The image processing apparatus according to claim 3, wherein the filtering processor is configured to switch to the post-filtering path when a ratio of character information and picture information to the information of the image data is larger than a predetermined value.

6. The image processing apparatus of claim 1, wherein the filtering processor is configured to output data to the data compressor and to receive data from the data expander.

7. A method for filtering image data comprising:
choosing between a pre-filtering path and a post-filtering path;
filtering raw image data when the pre-filtering path is chosen;
compressing the image data filtered when the pre-filtering path is chosen, and
compressing the raw image data when the post-filtering path is chosen;
storing the image data compressed;
expanding the image data stored; and
filtering the image data expanded when the post-filtering path is chosen.

8. The method according to claim 7, wherein the compressing includes irreversibly compressing any one of the image data filtered and the raw image data.

9. The method according to claim 7, wherein the choosing includes choosing between the pre-filtering path and the post-filtering path based on information of the image data.

10. The method according to claim 9, wherein the choosing includes choosing the pre-filtering path when a ratio of character information to the information of the image data is larger than a predetermined value.

11. The method according to claim 9, wherein the choosing includes choosing the post-filtering path when a ratio of character information and picture information to the information of the image data is larger than a predetermined value.

* * * * *